(12) United States Patent
Calvarese et al.

(10) Patent No.: US 8,628,682 B2
(45) Date of Patent: Jan. 14, 2014

(54) COMPOSITIONS COMPRISING A FLUOROSURFACTANT AND A HYDROTROPE

(75) Inventors: Thomas G. Calvarese, Wilmington, DE (US); Yamaira Gonzalez, Wilmington, DE (US); Viacheslav A. Petrov, Hockessin, DE (US); Weiming Qiu, Wilmington, DE (US); Anilkumar Raghavanpillai, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 66 days.

(21) Appl. No.: 13/279,536

(22) Filed: Oct. 24, 2011

(65) Prior Publication Data

US 2013/0102685 A1    Apr. 25, 2013

(51) Int. Cl.
*C09K 13/08* (2006.01)

(52) U.S. Cl.
USPC ..... 252/79.3; 252/79.1; 252/79.4; 424/70.19; 424/70.21; 424/70.22; 424/70.23; 424/70.24; 424/70.27; 424/70.28; 424/70.31; 134/22.19; 510/155; 510/535

(58) Field of Classification Search
None
See application file for complete search history.

(56) References Cited

U.S. PATENT DOCUMENTS

| | | | |
|---|---|---|---|
| 2,694,083 A | 11/1954 | Moreton et al. | |
| 3,562,156 A | 2/1971 | Francen | |
| 3,849,315 A | 11/1974 | Chiesa, Jr. | |
| 4,042,522 A | 8/1977 | Falk | |
| 4,089,804 A | 5/1978 | Falk | |
| 4,722,904 A | 2/1988 | Feil | |
| 5,074,358 A | 12/1991 | Rendall et al. | |
| 5,616,273 A | 4/1997 | Clark et al. | |
| 6,136,770 A | 10/2000 | Cheung et al. | |
| 6,281,178 B1 | 8/2001 | Ryklin et al. | |
| 6,506,806 B2 | 1/2003 | Taylor et al. | |
| 6,555,511 B2 | 4/2003 | Renfrow | |
| 2006/0199757 A1 | 9/2006 | Renfrow | |
| 2006/0241011 A1* | 10/2006 | Renfrow | 510/499 |
| 2008/0199814 A1* | 8/2008 | Brzozowy et al. | 430/312 |

FOREIGN PATENT DOCUMENTS

| | | | |
|---|---|---|---|
| WO | 2005097958 A1 | 10/2005 | |
| WO | WO2010023673 * | 3/2010 | G01R 33/00 |

OTHER PUBLICATIONS

Liu, Yong et al., Synthesis and Protection of Aryl Sulfates Using the 2,2,-Trichloroethyl Moiety, Organic Letters, 2004, pp. 209-212, vol. 6, No. 2, American Chemical Society.

Gupton, John T. et al., Reaction of Activated Aryl and Heteroaryl Halides with Hexamethylphosphoramide, Journal of Organic Chemistry, 1983, pp. 2933-2936, vol. 48, American Chemical Society.

Louie, Janis et al., Palladium-Catalyzed Synthesis of Arylamines from Aryl Halides, Mechanistic Studies Lead to Coupling in the Absence of Tin Reagents, Tetrahedron Letters, 1995, pp. 3609-3612, vol. 36, No. 21, Elsevier Science Ltd.

Gooben, Lukas J. et al., Practical Protocol for the Palladium-Catalyzed Synthesis of Arylphosphonates from Bromoarenes and Diethyl Phosphite, Synlett, 2005, pp. 445-448, No. 3.

Ansink, Harold R. W. et al., Reactions of sulfur trioxide with benzene derivatives containing a deactivating oxy substituent, Recueil des Travaux Chimiques des Pays-Bas, May 1992, pp. 215-221, vol. 111, No. 5.

* cited by examiner

*Primary Examiner* — Lan Vinh
*Assistant Examiner* — Jiong-Ping Lu

(57) ABSTRACT

Compositions comprising a fluorosurfactant and a hydrotrope are disclosed. The hydrotropes are either cationic or anionic benzene derivatives comprising fluoro-substituted functional groups and polar groups. The compositions are useful in various surfactant applications.

11 Claims, No Drawings

COMPOSITIONS COMPRISING A FLUOROSURFACTANT AND A HYDROTROPE

FIELD OF THE INVENTION

The present invention relates to compositions comprising a fluorosurfactant and a hydrotrope, and their use in surfactant applications.

BACKGROUND OF THE INVENTION

Recent concerns over the environmental fate of fluorosurfactants and the cost of fluorosurfactants are fueling efforts to develop new surfactant systems that contain less fluorine. U.S. Pat. No. 4,089,804 discloses a method of improving fluorinated surfactants by employing a fluorinated synergist, $(R_f)_nT_mZ$, wherein $R_f$ is a perfluorinated aliphatic group, T is alkylene, arylene, alkylenethio alkylene, alkyleneoxyalkylene or alkyleneiminoalkylene, Z is a neutral or a polar group, n is 1 or 2, and m is 0 to 2.

There remains a need for developing other surfactant systems having reduced fluorine content with a low environmental footprint and/or improved performance.

SUMMARY OF THE INVENTION

An aspect of the present invention relates to a composition comprising a fluorosurfactant and a hydrotrope, wherein the weight ratio of the fluorosurfactant to the hydrotrope is 1:10 to 10:1.

Another aspect of the present invention relates to a method of altering the surface behavior of an agent, comprising adding to the agent a composition comprising a fluorosurfactant and a hydrotrope, wherein the weight ratio of the fluorosurfactant to the hydrotrope is 1:10 to 10:1.

A further aspect of the present invention relates to a process comprising contacting an article with a composition comprising a fluorosurfactant and a hydrotrope, wherein the weight ratio of the fluorosurfactant to the hydrotrope is 1:10 to 10:1.

DETAILED DESCRIPTION

An aspect of the present invention relates to a composition comprising a fluorosurfactant and a hydrotrope. "Hydrotropes" used in this invention comprise a hydrophilic part and a hydrophobic part. They are either cationic or anionic aromatic compounds comprising fluoro-substituted functional groups and polar groups. They include benzene derivatives corresponding to formulae (I) and (II):

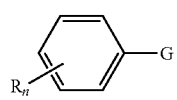
(I)

wherein:
R=$R_f$ or $OR_f$,
$R_f$=(per)fluorinated $C_1$-$C_3$ alkyl;
n=1-3; and
G=—$SO_3M$, —$OSO_3M$, —$OPO_3(M_1)(M_2)$, or —$PO_3(M_1)(M_2)$,
M=H, Na, K, or $NH_4$,
$M_1$=H, Na, K, or $NH_4$, and
$M_2$=H, Na, K, or $NH_4$;

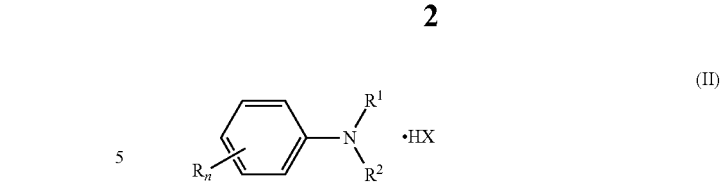
(II)

wherein:
R=$R_f$ or $OR_f$,
$R_f$=(per)fluorinated $C_1$-$C_3$ alkyl;
n=1-3;
$R^1$=H or $C_1$-$C_3$ alkyl;
$R^2$=H or $C_1$-$C_3$ alkyl; and
X=Cl, Br, or I.

Sulfonate derivatives in formula (I) (G=—$SO_3M$) can be synthesized by sulfonation of fluorinated alkylbenzene, followed by treating the reaction mixture with a sodium hydroxide solution, as per the procedure described in *Recueil des Travaux Chimiques des Pays-Bas*, 111, 1992, 215. Sulfate derivatives in formula (I) (G=—$OSO_3M$) can be synthesized by reacting the corresponding phenol derivatives with $ClSO_3CH_2CCl_3$ to yield diesters, which are converted to aryl sulfate monoesters in high yield using Pd/C-ammonium formate or Zn-ammonium formate, as per the procedure described in Liu, Y.; Lien, I. F.; Ruttgaizer, S.; Dove, P.; Taylor, S. D. *Org. Let.* 2004, 6, 209. Phosphate derivatives in formula (I) (G=—$OPO_3(M_1)(M_2)$) can be synthesized by reacting the corresponding phenol derivatives with $POCl_3$ to yield tris(fluorinated alkylphenyl)phosphates as per the procedure described in U.S. Pat. No. 2,694,083. Tris(fluorinated alkylphenyl)phosphates are then treated with a sodium hydroxide solution to yield the phosphate derivatives. Phosphonate derivatives in formula (I) (G=—$PO_3(M_1)(M_2)$) can be synthesized by using the palladium-catalyzed cross-coupling of dialkyl phosphites with bromoarenes to afford dialkyl arylphosphonates (Goossen, L. J.; Dezfuli, M. K. *Synlett.*, 2005, 445). The dialkyl arylphosphonates are then hydrolyzed using NaOH to yield the desired phosphonate derivatives.

Suitable anilinium derivatives in formula (II) or aniline derivatives include those available from Alfa Aesar (e.g. trifluoromethylaniline hydrochloride and trifluoromethoxyaniline), SynQuest Fluorochemicals (e.g. 4-(1,1,2,2-tetrafluoroethoxy)aniline), and Finechemie Group-Xinchang Finecheme Research Institute (e.g. N,N-di-methyl-4-trifluoromethoxyaniline), or can be made by the reaction of aryl halides with hexaalkylphosphoramide (Gupton, J. T.; Idoux, J. P.; Baker, G.; Colon, C.; Crews, A. D.; Jurss, C. D.; Rampi, R. C. *J. Org. Chem.* 1983, 48, 2933) or the reaction of aryl halides with secondary amines (Louie, J.; Hartwig, J. F. *Tetrahedron Lett.* 1995, 36, 3609).

Water-soluble cationic, anionic and amphoteric fluorosurfactants can be used in this invention. "Cationic fluorosurfactants" denotes fluorosurfactants containing cationic groups and/or groups able to be protonated into cationic groups. In some embodiments, the cationic fluorosurfactant comprises primary, secondary, tertiary, and/or quaternary amine groups. In some embodiments, the cationic fluorosurfactant comprises a pyridinium group. "Anionic fluorosurfactants" denotes fluorosurfactants containing anionic groups and/or groups able to be deprotonated into anionic groups. In some embodiments, the anionic fluorosurfactant comprises carboxy group(s), sulfonic group(s), phosphate group(s), phosphonate group(s) or their corresponding salts. "Amphoteric fluorosurfactants" denotes fluorosurfactants containing at least one cationic group and at least one anionic group defined above for cationic and anionic fluorosurfactants. The three types of fluorosurfactants include, in particular, those corresponding to formulae (III), (IV), and (V):

$$A_1-C_2H_4-Y \quad (III)$$

wherein
$A_1$=linear or branched $C_3$-$C_{16}$ perfluoroalkyl; and
$Y$=—$CO_2M_3$, —$SO_3M_3$, —$SCH_2CH_2CO_2M_3$, —$SO_2$—$NH(CH_2)_3$—$N^+(CH_3)_3.I^-$, —$SCH_2CH_2N^+(CH_3)_3.CH_3$—$SO_4$, —$OPO(ONH_4)_2$

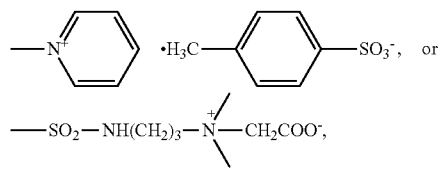

wherein
$M_3$=H, alkali metal, or $NH_4^+$;

$$A_2\text{-}R^3 \quad (IV)$$

wherein:
$A_2$=linear or branched $C_4$-$C_{16}$ perfluoroalkyl; and
$R^3$=—$SO_3^-.N^+(R^4)_4$, —$CO_2N^+(R^4)_4$, —$SO_2N(R^4)CH_2CO_2^-.M_4^+$,
or —$SO_2$—$NH(CH_2)_p$—$N^+(R^4)_3.I^-$,
  wherein:
    $R^4$=H, or $C_1$-$C_4$ alkyl,
    $M_4$=H, or alkali metal, and
    p=1-4;

$$(A_3C_2H_4O)_xP(O)(R^5)_y(R^6)_{3-x-y} \quad (V)$$

wherein
$A_3$=linear or branched $C_3$-$C_8$ perfluoroalkyl;
x=1-2;
y=1-2;
$R^5$=$ONH_4^+$, or OH; and
$R^6$=$OC_2H_4OH$.

Suitable fluorinated surfactants include those available from E. I. du Pont de Nemours and Company (Wilmington, Del.) under the tradenames Zonyl®, Capstone®, and Forafac® and from 3M Company (Minneapolis, Minn.) under the tradename Fluorad®.

Some examples of suitable fluorosurfactants according to formulae (III), (IV), and (V) are shown below.

Formula (III)

$A_1$—$CH_2CH_2$—$SO_2$—$NH(CH_2)_3$—$N^+(CH_3)_3$•$I^-$

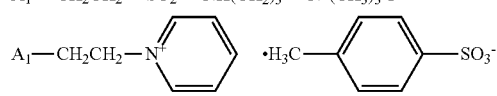

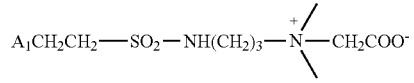

$A_1$—$C_2H_4$—$SCH_2CH_2CO_2M$ $A_1$—$C_2H_4$—$SCH_2CH_2N^+(CH_3)_3$•$CH_3$—$SO_4^-$ $A_2$-$SO_2N(C_2H_5)CH_2CO_2^-.K^+$ $A_2$-$SO_2$—$NH(C_3H_6)_p$—$N^+(CH_3)_3.I^-$ $A_2$-$SO_3^-.NH_4^+$ $A_2$-$SO_2N(C_2H_5)CH_2CO_2^-.NH_4^+$ Formula (IV)

$(A_3$-$C_2H_4O)_{1-2}$-$PO(ONH_4)_{2-1}$ $(A_3$-$C_2H_4O)_{1-2}$-$PO(OH)_{2-1}$ Formula (V)

The compositions of the present invention can be prepared by mixing a fluorosurfactant solution and a hydrotrope solution. The amount of fluorosurfactant in the fluorosurfactant solution is from 0.1 wt % to 100 wt %. When the amount of fluorosurfactant in the fluorosurfactant solution is 100 wt %, it means neat fluorosurfactant is used. The amount of hydrotrope in the hydrotrope solution is from 0.1 wt % to 100 wt %. When the amount of hydrotrope in the hydrotrope solution is 100 wt %, it means neat hydrotrope is used. The weight ratio of the fluorosurfactant to the hydrotrope can be in the range of 1:10 to 10:1, or 1:8 to 8:1, or 1:5 to 5:1. The total concentration of the fluorosurfactant and the hydrotrope in the compositions is 0.1 wt % or lower.

Another aspect of the present invention relates to a method of altering the surface behavior of an agent, comprising adding to the agent a composition comprising a fluorosurfactant and a hydrotrope, wherein the weight ratio of the fluorosurfactant to the hydrotrope is in the range of 1:10 to 10:1, or 1:8 to 8:1, or 1:5 to 5:1. The hydrotrope comprises an aromatic compound selected from the group of compounds of formula (I) and compounds of formula (II). The amount of the composition comprising a fluorosurfactant and a hydrotrope added to the agent is from 0.001 wt % to 5 wt %. Types of surface behavior that can be altered include wetting, penetration, spreading, leveling, flowing, emulsifying, dispersing, repelling, releasing, lubricating, etching, bonding, and stabilizing. Types of agents to which the composition of this invention can be added include coating compositions, lattices, polymers, floor finishes, inks, emulsifying agents, foaming agents, release agents, repellency agents, flow modifiers, film evaporation inhibitors, wetting agents, leveling agents, penetrating agents, cleaners, grinding agents, electroplating agents, corrosion inhibitors, etchant solutions, soldering agents, dispersion aids, antimicrobial agents, pulping aids, rinsing aids, polishing agents, personal care compositions, drying agents, antistatic agents, bonding agents, and mixtures thereof.

A further aspect of the present invention relates to a process comprising contacting an article with a composition comprising a fluorosurfactant and a hydrotrope, wherein the weight ratio of the fluorosurfactant to the hydrotrope is 1:10 to 10:1, or 1:8 to 8:1, or 1:5 to 5:1. The hydrotrope comprises an aromatic compound selected from the group of compounds of formula (I) and compounds of formula (II).

Suitable articles include: polymers, metals, wood, glass, ceramics, bricks, concretes, cements, natural or synthetic stones, tiles, paper, leather, and textile materials. Suitable polymers include: polycarbonates, polyesters (such as polyethylene terephthalate), polyolefins, polyurethanes, acrylics, polyamides (such as nylon 6, nylon 6,6, and nylon 6,12), polyimides, vinyl polymers (such as polyvinyl chloride), fluoropolymers, silicon polymers (such as polysilanes and polysiloxanes), amino resins, epoxy resins, and phenolic resins. The polymeric articles can be in the form of a fiber, a film, a sheet, a formed or molded part, a laminate, an extruded profile, a coated part, a foamed part, a bead, a particle, or a powder. Typical natural stones include granite and marble, and examples of synthetic stones include solid surface materials such as Corian® from DuPont and quartz surfaces such as Zodiaq® from DuPont.

The compositions of the present invention can be used in waxes, finishes, and polishes to improve wetting, leveling, and gloss for floors, furniture, shoes, and automotive care. The compositions of the present invention are useful in a variety of aqueous and non-aqueous cleaning products for glass, tile, marble, ceramics, linoleum, metal, stone, laminates, natural and synthetic rubbers, resins, plastics, fibers, and fabrics.

The compositions of the present invention can also be employed as additives in agricultural compositions containing herbicides, hormone growth regulators, parasiticides, insecticides, germicides, bactericides, nematocides, microbiocides, fungicides, miticides, defoliants, fertilizers, therapeutic agents, and antimicrobials, with one or more of the following functions: substrate wetting agent, adjuvant, foam inhibitor, dispersant, and emulsion stabilizer. The compositions of the present invention are also suitable as wetting agents for foliage, livestock dips, and livestock skins; as an ingredient in sanitizing, discoloring and cleaning compositions; and in insect repellent compositions.

The compositions of the present invention are suitable for the use in compositions for personal care products (such as shampoos, conditioners, creams, and rinses), cosmetic products for the skin (such as therapeutic or protective creams and lotions, oil and water repellent cosmetic powders, deodorants and anti-perspirants), nail polish, lipstick, toothpastes, fabric care products (such as stain pretreatments and/or stain removers for clothing, carpets and upholstery), laundry detergents, and rinse-aids (for car washes and in automatic dishwashers).

The compositions of the present invention are suitable for the use in the petroleum and gas industries as wetting agents and treatment agents to prevent and remove film evaporation and gas/oil blocking for gas, gasoline, jet fuel, solvents and hydrocarbons.

The compositions of the present invention are suitable for the use in printing inks, resist inks, developer solutions, photoresists, cleaning solutions, oxide etching compositions, and polishers in the manufacturing, processing, and handling of semiconductors and electronics.

The compositions of the present invention are useful as fire fighting agents, dry chemical fire extinguishers, and aerosol-type fire extinguishers.

The compositions of the present invention are suitable for the use as wetting agents, antifoaming agents, penetrating agents and emulsifying agents in textile and leather industries; lubricants for textiles, nonwoven fabrics and leather treatment; spreading and uniformity agents for fiber finishes; wetting agents for dyeing; binders in nonwoven fabrics; and penetration additives for bleaches.

The compositions of the present invention are further useful as thickening agents in mining industry, metal-working industry, pharmaceutical industry, household, cosmetic and personal products, photography and graphic arts.

The compositions of the present invention can be used as antifogging agents for glass surfaces and photography films, and as antistatic agents for magnetic tapes, phonograph records, floppy disks, disk drives, rubber compositions, PVC, polyester film, photography films, and as surface treatment agents for optical elements (such as glass, plastic, or ceramic beads).

The compositions of the present invention are also useful as foam control agents in polyurethane foams, spray-on oven cleaners, foamed kitchen and bathroom cleansers and disinfectants, aerosol shaving foams, and textile-treatment baths.

The compositions of the present invention are useful as emulsifying agents for polymerization, particularly of fluoromonomers, as latex stabilizers, as mold-release agents for silicones, photoemulsion stabilizers, inorganic particles, and pigments.

EXAMPLES

Materials and Methods

Trifluoromethylaniline hydrochloride (TMAHC) was obtained from Alfa Aesar and was used as supplied. Fluorosurfactant S1 is an anionic fluorosurfactant containing a mixture of a fluoroalkyl phosphate ammonium salt and a glycol ester, in which the fluoroalkyl chain comprises 2-16 carbon atoms, predominantly 8 carbon atoms. Fluorosurfactant S2 is a cationic fluorosurfactant containing 1-(3,3,4,4,5,5,6,6,7,7,8,8,9,9,10,10,10-heptadecafluorodecyl)-pyridinium, 4-methylbenzene sulfonate. Fluorosurfactant S3 is an anionic fluorosurfactant containing a mixture of a fluoroalkyl phosphate ammonium salt and a glycol ester, in which the fluoroalkyl chain comprises 6 carbon atoms. All fluorosurfactants were obtained from E. I. du Pont de Nemours and Company, Wilmington, Del.

Synthesis of Sodium-4-(trifluoromethoxy)benzenesulfonate (3FMBSNa)

Sodium-4-(trifluoromethoxybenzene)sulfonate was prepared as per the following procedure (*Recueil des Travaux Chimiques des Pays-Bas*, 111, 1992, 215).

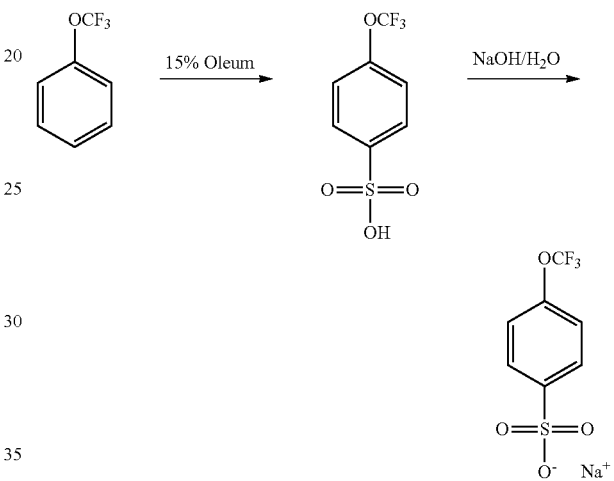

A 100 mL flask equipped with a stir-bar and a nitrogen bubbler was charged with (trifluoromethoxy)-benzene (5.015 g) at room temperature. Oleum (15% $SO_3$, 9.30 g) was added to the above flask at 10° C. The reaction mixture was allowed to warm to room temperature and stirred at room temperature for 15 h. A sodium hydroxide solution (7.75 g, in 23 mL water) was slowly added to the reaction mixture while the reaction mixture was cooled with an ice-water bath. The resulting solid was collected by filtration, dried under vacuum, and then extracted with refluxing ethanol. The ethanol solution was dried to give sodium 4-(trifluoromethoxy)benzenesulfonate (3FMBSNa) 2.0 g (yield 24%): $^1$H NMR ($D_2O$) 7.45 (d, J=9 Hz, 2H), 7.89 (m, 2H) ppm; $^{19}$F NMR ($D_2O$)-58.1 (s) ppm.

Synthesis of sodium-4-(1,1,2,2-tetrafluorethoxy) benzenesulfonate (4FEBSNa)

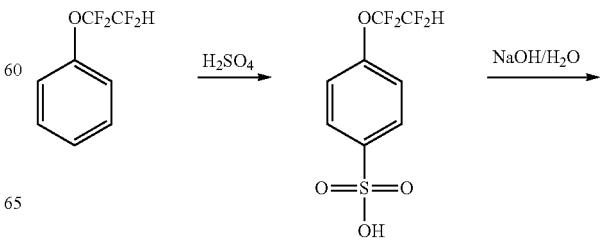

-continued

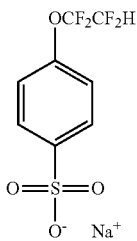

A 50 mL flask equipped with a stir-bar and a nitrogen bubbler was charged with concentrated sulfuric acid (14.55 g) and 4-(1,1,2,2-tetrafluoroethoxy)benzene (4.9 g) at room temperature. The reaction mixture was stirred at room temperature for 17 h. A sodium hydroxide solution (12.25 g, in 40.02 g water) was slowly added to the reaction mixture while the reaction mixture was cooled with an ice-water bath. The resulting solid was filtered off. The filtrate was neutralized with concentrated hydrochloric acid (~3 mL) and used to wash the solid. This wash solution was neutralized with sodium bicarbonate to pH~7, and used to wash the solid again. The solid was extracted with refluxing ethanol. The ethanol solution was dried to give sodium 4-(1,1,2,2-tetrafluoroethoxy)benzenesulfonate (4FEBSNa) 4.4 g (yield 59%): $^1$H NMR (D$_2$O) 6.34 (tt, 52, 3 Hz, 1H), 7.45 (d, J=9 Hz, 2H), 7.88 (m, 2H) ppm; $^{19}$F NMR (D$_2$O) −88.7 (m, 2F), −138.0 (dt, J=52, 5 Hz, 2F) ppm.

Preparation of Compositions Comprising a Fluorosurfactant and a Hydrotrope

A bulk solution of a hydrotrope was prepared by dissolving 0.04 g of the hydrotrope in 39.96 g of deionized water to obtain a 0.1 wt % solution. Similarly, a 0.1 wt % solution of a fluorosurfactant was prepared by dissolving 0.04 g of the fluorosurfactant in 39.96 g of water to obtain a 0.1 wt % solution. The mixtures were allowed to sonicate for 5 min.

Compositions (0.01 wt %) comprising a fluorosurfactant and a hydrotrope were prepared as described below:
a) For a 3:1 fluorosurfactant to hydrotrope ratio, 3.0 g of the 0.1 wt % fluorosurfactant and 1.0 g of the 0.1 wt % hydrotrope solution were added to a clean, tared centrifuge tube. The tube was filled with deionized water to bring the total weight of the solution up to 40.0 g to obtain a 0.01 wt % solution.
b) For a 1:1 fluorosurfactant to hydrotrope ratio, 2.0 g of the 0.1 wt % fluorosurfactant and 2.0 g of the 0.1 wt % hydrotrope solution were added to a clean, tared centrifuge tube. The tube was filled with deionized water to bring the total weight of the solution up to 40.0 g to obtain a 0.01 wt % solution.
c) For a 1:3 fluorosurfactant to hydrotrope ratio, 1.0 g of the 0.1 wt % fluorosurfactant and 3.0 g of the 0.1 wt % hydrotrope solution were added to a clean, tared centrifuge tube. The tube was filled with deionized water to bring the total weight of the solution up to 40.0 g to obtain a 0.01 wt % solution.
d) For a 0.01 wt % fluorosurfactant control, 4.0 g of the 0.1 wt % fluorosurfactant solution was added to a clean, tared centrifuge tube. The tube was filled with deionized water to bring the total weight of the solution to 40.0 g to obtain a 0.01 wt % solution.
e) For a 0.01 wt % hydrotrope control, 4.0 g of the 0.1 wt % hydrotrope solution was added to a clean, tared centrifuge tube. The tube was filled with deionized water to bring the total weight of the solution to 40.0 g to obtain a 0.01 wt % solution.

Test Method 1. Surface Tension Measurements

The surface tensions of the fluorosurfactants were measured in fresh MILLIPORE® filtered water using the Wilhelmy plate method (Acosta, E. J. and Reinartz, S., U.S. Pat. No. 7,385,077) on an automated Krüss tensiometer (Model K11, Krüss USA, Nazareth, Pa.). MILLIPORE® filters are available from Millipore Corporation, Billerica, Mass.

A clean, dry 50 mL plastic beaker was filled with approximately 40 mL of the desired solution for the surface tension measurement. The beaker was placed on the sample platform of the Krüss K11 tensiometer. The platinum surface tension probe was removed from the tensiometer hook and rinsed with deionized water and dried with the blue part of the flame from a propane torch. The probe was then air-cooled and reinserted onto the tensiometer hook. The surface tension measurements were performed for compositions comprising a fluorosurfactant and a hydrotrope of various ratios. It is preferred to start with the sample of deionized water, followed by the lowest to the highest fluorosurfactant to hydrotrope ratio.

Test Method 2—Wetting and Leveling Test

The wetting and leveling ability of the samples was tested by adding each sample to a floor polish (RHOPLEX® 3829, Rohm & Haas, Spring House, Pa.) and applying the mixture to half of a 12 inch×12 inch (30.36 cm×30.36 cm) vinyl tile that had been stripped with a Comet® cleaner. A 1 wt % solution of the composition comprising a fluorosurfactant and a hydrotrope to be tested was prepared by dilution with deionized water. Following the manufacturer protocols, a 100 g portion of the RHOPLEX® 3829 formulation was prepared, followed by addition of 0.75 g of the 1 wt % composition solution comprising a fluorosurfactant and a hydrotrope, to provide a test floor polish.

The test floor polish was applied to a tile by placing a 3 mL portion of the test polish in the center of the tile, spreading the solution from top to bottom using an applicator, and finally placing a large "X" across half of the tile, using the applicator. The tile was allowed to dry for 30 min. A total of 5 coats was applied. After each coat, the tile was rated on a 1 to 5 scale (1 being the worst, 5 the best) on the surfactant's ability to promote wetting and leveling of the polish on the tile surface. The rating was determined based on comparison of a tile treated with the floor polish that contained no composition of this invention or leveling aids, according to the following scale:

Subjective Tile-Rating Scale
1 Uneven surface coverage of the film, significant streaking and surface defects
2 Visible streaking and surface defects, withdrawal of the film from the edges of the tile
3 Numerous surface defects and streaks are evident but, generally, film coats entire tile surface
4 Minor surface imperfections or streaking
5 No visible surface defects or streaks Example 1

This example describes the preparation and testing of compositions comprising anionic fluorosurfactant S1 and cationic hydrotrope 4-trifluoromethylaniline hydrochloride (TMAHC) with varying ratios.

By following the procedure described above, compositions comprising S1 and TMAHC were prepared in ratios of 3:1, 1:1 and 1:3 to provide 0.01 wt % solutions with different amounts of fluorosurfactant. Surface tensions of the compositions and controls were measured according to Test Method 1 and the results are summarized in Table 1.

TABLE 1

| Sample | Concentration (wt %) | Fluorosurfactant present in the composition (wt %) | Surface tension (mN/m) |
|---|---|---|---|
| TMAHC Control | 0.01 | 0 | 44.1 |
| S1 Control | 0.01 | 0.0035 | 23.3 |
| 3:1 S1/TMAHC | 0.01 | 0.0026 | 22.3 |
| 1:1 S1/TMAHC | 0.01 | 0.0018 | 24.1 |
| 1:3 S1/TMAHC | 0.01 | 0.0009 | 31.0 |

Example 2

This example describes the preparation and testing of compositions comprising anionic fluorosurfactant S1 and anionic hydrotrope sodium-4-(trifluoromethoxy)benzene sulfonate (3FMBSNa) with varying ratios.

By following the procedure described above, compositions comprising S1 and 3FMBSNa were prepared in ratios of 3:1, 1:1 and 1:3 to provide 0.01 wt % solutions with different amounts of fluorosurfactant. Surface tensions of the compositions and controls were measured according to Test Method 1 and the results are summarized in Table 2.

TABLE 2

| Sample | Concentration (wt %) | Fluorosurfactant present in the composition (wt %) | Surface tension (mN/m) |
|---|---|---|---|
| 3FMBSNa Control | 0.01 | 0 | 71.9 |
| S1 Control | 0.01 | 0.0035 | 22.3 |
| 3:1 S1/3FMBSNa | 0.01 | 0.0026 | 23.3 |
| 1:1 S1/3FMBSNa | 0.01 | 0.0018 | 25.4 |
| 1:3 S1/3FMBSNa | 0.01 | 0.0009 | 45.4 |

Example 3

This example describes the preparation and testing of compositions comprising anionic fluorosurfactant S1 and anionic hydrotrope sodium-4-(1,1,2,2-tetrafluorethoxy)benzene sulfonate (4FEBSNa) with varying ratios.

By following the procedure described above, compositions comprising S1 and 4FEBSNa were prepared in ratios of 3:1, 1:1 and 1:3 to provide 0.01 wt % solutions with different amounts of fluorosurfactant. Surface tensions of the compositions and controls were measured according to Test Method 1 and the results are summarized in Table 3.

TABLE 3

| Sample | Concentration (wt %) | Fluorosurfactant present in the composition (wt %) | Surface tension (mN/m) |
|---|---|---|---|
| 4FMBSNa Control | 0.01 | 0.0 | 72.5 |
| S1 Control | 0.01 | 0.0035 | 22.3 |
| 3:1 S1/4FEBSNa | 0.01 | 0.0026 | 21.3 |
| 1:1 S1/4FEBSNa | 0.01 | 0.0018 | 23.2 |
| 1:3 S1/4FEBSNa | 0.01 | 0.0009 | 32.0 |

Example 4

This example describes the preparation and testing of compositions comprising cationic fluorosurfactant S2 and cationic hydrotrope 4-trifluoromethylanilinium hydrochloride (TMAHC) with varying ratios.

By following the procedure described above, compositions comprising S2 and TMAHC were prepared in ratios of 3:1, 1:1 and 1:3 to provide 0.01 wt % solutions with different amounts of fluorosurfactant. Surface tensions of the compositions and controls were measured according to Test Method 1 and the results are summarized in Table 4.

TABLE 4

| Sample | Concentration (wt %) | Fluorosurfactant present in the composition (wt %) | Surface tension (mN/m) |
|---|---|---|---|
| TMAHC Control | 0.01 | 0 | 44.1 |
| S2 Control | 0.01 | 0.005 | 34.2 |
| 3:1 S2/TMAHC | 0.01 | 0.00375 | 28.1 |
| 1:1 S2/TMAHC | 0.01 | 0.0025 | 30.8 |
| 1:3 S2/TMAHC | 0.01 | 0.00125 | 41.1 |

Example 5

This example describes the preparation and testing of compositions comprising cationic fluorosurfactant S2 and anionic hydrotrope sodium-4-(trifluoromethoxy)benzene sulfonate (3FMBSNa) with varying ratios.

By following the procedure described above, compositions comprising S2 and 3FMBSNa were prepared in ratios of 3:1, 1:1 and 1:3 to provide 0.01 wt % solutions with different amounts of fluorosurfactant. Surface tensions of the compositions and controls were measured according to Test Method 1 and the results are summarized in Table 5.

TABLE 5

| Sample | Concentration (wt %) | Fluorosurfactant present in the composition (wt %) | Surface tension (mN/m) |
|---|---|---|---|
| 3FMBSNa Control | 0.01 | 0 | 71.9 |
| S2 Control | 0.01 | 0.005 | 33.3 |
| 3:1 S2/3FMBSNa | 0.01 | 0.00375 | 19.8 |
| 1:1 S2/3FMBSNa | 0.01 | 0.0025 | 20.6 |
| 1:3 S2/3FMBSNa | 0.01 | 0.00125 | 22.0 |

Example 6

This example describes the preparation and testing of compositions comprising cationic fluorosurfactant S2 and anionic hydrotrope sodium-4-(1,1,2,2-tetrafluorethoxy)benzene sulfonate (4FEBSNa) with varying ratios.

By following the procedure described above, compositions comprising S2 and 4FEBSNa were prepared in ratios of 3:1, 1:1 and 1:3 to provide 0.01 wt % solutions with different amounts of fluorosurfactant. Surface tensions of the compositions and controls were measured according to Test Method 1 and the results are summarized in Table 6.

TABLE 6

| Sample | Concentration (wt %) | Fluorosurfactant present in the composition (wt %) | Surface tension (mN/m) |
|---|---|---|---|
| 4FMBSNa Control | 0.01 | 0 | 72.5 |
| S2 Control | 0.01 | 0.005 | 33.3 |
| 3:1 S2/4FEBSNa | 0.01 | 0.00375 | 20.2 |
| 1:1 S2/4FEBSNa | 0.01 | 0.0025 | 20.0 |
| 1:3 S2/4FEBSNa | 0.01 | 0.00125 | 20.7 |

Example 7

This example describes the preparation and testing of compositions comprising anionic fluorosurfactant S3 and cationic hydrotrope 4-trifluoromethylanilinium hydrochloride (TMAHC) with varying ratios.

By following the procedure described above, compositions comprising S3 and TMAHC were prepared in ratios of 3:1, 1:1 and 1:3 to provide 0.01 wt % solutions with different amounts of fluorosurfactant. Surface tensions of the and controls were measured according to Test Method 1 and the results are summarized in Table 7.

TABLE 7

| Sample | Concentration (wt %) | Fluorosurfactant present in the composition (wt %) | Surface tension (mN/m) |
|---|---|---|---|
| TMAHC Control | 0.01 | 0 | 44.1 |
| S3 Control | 0.01 | 0.0035 | 23.4 |
| 3:1 S3/TMAHC | 0.01 | 0.0026 | 16.8 |
| 1:1 S3/TMAHC | 0.01 | 0.0018 | 14.6 |
| 1:3 S3/TMAHC | 0.01 | 0.0009 | 22.4 |

All fluorosurfactant-hydrotrope compositions (in Tables 1-7) showed comparable surface tension reduction at a reduced level of fluorosurfactant concentration, compared to the corresponding fluorosurfactant controls.

Example 8

The compositions comprising anionic fluorosurfactant S1 and anionic hydrotrope sodium-4-(1,1,2,2-tetrafluoroethoxy) benzene sulfonate (4FEBSNa) prepared as per Example 3 were evaluated for performance as wetting and leveling agents in a commercial floor polish according to Test Method 2. In a control, no leveling agent was added. A comparative experiment was performed using S1 as leveling agent.

All samples were measured at 75 ppm (microgram/g) loading and at the same time to nullify potential variations in room humidity and temperature. The results are listed in Table 8, where higher ratings indicate better performance. The results indicate that the compositions comprising S1 and 4FEBSNa showed comparable wetting and leveling characteristics at a reduced level of fluorosurfactant concentration, compared to S1.

TABLE 8

Ratings for Wetting and Leveling Test

| | Coating No. | | | | | |
|---|---|---|---|---|---|---|
| | 1 | 2 | 3 | 4 | 5 | |
| | | | Rating | | | Average |
| Control | 2 | 2 | 1 | 1 | 1 | 1.4 |
| Comparative (S1) | 2 | 3 | 4 | 4 | 4.5 | 3.5 |
| 3:1 S1/4FEBSNa | 2 | 3 | 4 | 4 | 4 | 3.5 |
| 1:1 S1/4FEBSNa | 2 | 3 | 3.5 | 4 | 4 | 3.3 |

What is claimed is:

1. A composition comprising a fluorosurfactant and a hydrotrope wherein the hydrotrope comprises a compound selected from the group consisting of compounds of formula (I) and compounds of formula (II):

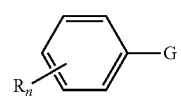

wherein:
R=$R_f$ or $OR_f$,
$R_f$=(per)fluorinated $C_1$-$C_3$ alkyl;
n=1-3; and
G=—$SO_3M$, —$OSO_3M$, —$OPO_3(M_1)(M_2)$ or —$PO_3(M_1)(M_2)$,
M=H, Na, K, or $NH_4$,
$M_1$=H, Na, K, or $NH_4$, and
$M_2$=H, Na, K, or $NH_4$;

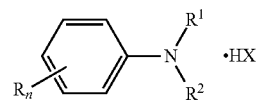

wherein:
R=$R_f$ or $OR_f$,
$R_f$=(per)fluorinated $C_1$-$C_3$ alkyl;
n=1-3;
$R^1$=H or $C_1$-$C_3$ alkyl;
$R^2$=H or $C_1$-$C_3$ alkyl; and
X=Cl, Br, or I;
and wherein the weight ratio of the fluorosurfactant to the hydrotrope is in the range of 1:10 to 10:1.

2. The composition of claim 1, wherein the fluorosurfactant is an anionic, a cationic, or an amphoteric fluorosurfactant.

3. A method of altering the surface behavior of an agent, comprising adding to the agent a composition comprising a fluorosurfactant and a hydrotrope wherein the hydrotrope comprises a compound selected from the group consisting of compounds of formula (I) and compounds of formula (II):

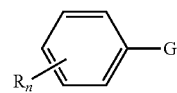

wherein:
R=$R_f$ or $OR_f$,
$R_f$=(per)fluorinated $C_1$-$C_3$ alkyl;
n=1-3; and
G=—$SO_3M$, —$OSO_3M$, —$OPO_3(M_1)(M_2)$, or —$PO_3(M_1)(M_2)$,
M=H, Na, K, or $NH_4$,
$M_1$=H, Na, K, or $NH_4$, and
$M_2$=H, Na, K, or $NH_4$;

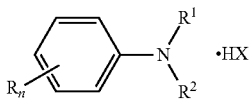
(II)

wherein:
R=$R_f$ or $OR_f$,
$R_f$=(per)fluorinated $C_1$-$C_3$ alkyl;
n=1-3;
$R^1$=H or $C_1$-$C_3$ alkyl;
$R^2$=H or $C_1$-$C_3$ alkyl; and
X=Cl, Br, or I;
and wherein the weight ratio of the fluorosurfactant to the hydrotrope is in the range 1:10 to 10:1.

4. The method of claim 3, wherein the fluorosurfactant is an anionic, a cationic, or an amphoteric fluorosurfactant.

5. The method of claim 3, wherein the agent is selected from the group consisting of: coating compositions, lattices, polymers, floor finishes, inks, emulsifying agents, foaming agents, release agents, repellency agents, flow modifiers, film evaporation inhibitors, wetting agents, leveling agents, penetrating agents, cleaners, grinding agents, electroplating agents, corrosion inhibitors, etchant solutions, soldering agents, dispersion aids, antimicrobial agents, pulping aids, rinsing aids, polishing agents, personal care compositions, drying agents, antistatic agents, bonding agents, and mixtures thereof.

6. A process comprising contacting an article with a composition comprising a fluorosurfactant and a hydrotrope wherein the hydrotrope comprises a compound selected from the group consisting of compounds of formula (I) and compounds of formula (II):

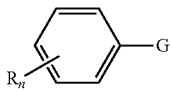
(I)

wherein:
R=$R_f$ or $OR_f$,
$R_f$=(per)fluorinated $C_1$-$C_3$ alkyl;
n=1-3; and
G=—$SO_3M$, —$OSO_3M$, —$OPO_3(M_1)(M_2)$, or —$PO_3(M_1)(M_2)$, M=H, Na, K, or $NH_4$,
$M_1$=H, Na, K, or $NH_4$, and
$M_2$=H, Na, K, or $NH_4$;

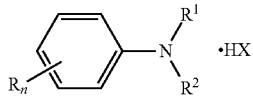
(II)

wherein:
R=$R_f$ or $OR_f$,
$R_f$=(per)fluorinated $C_1$-$C_3$ alkyl;
n=1-3;
$R^1$=H or $C_1$-$C_3$ alkyl;
$R^2$=H or $C_1$-$C_3$ alkyl; and
X=Cl, Br, or I;
and wherein the weight ratio of the fluorosurfactant to the hydrotrope is in the range of 1:10 to 10:1.

7. The process of claim 6, wherein the fluorosurfactant is an anionic, a cationic, or an amphoteric fluorosurfactant.

8. The process of claim 6, wherein the composition further comprises an agent.

9. The process of claim 8, wherein the agent is selected from the group consisting of: coating compositions, lattices, polymers, floor finishes, inks, emulsifying agents, foaming agents, release agents, repellency agents, flow modifiers, film evaporation inhibitors, wetting agents, leveling agents, penetrating agents, cleaners, grinding agents, electroplating agents, corrosion inhibitors, etchant solutions, soldering agents, dispersion aids, antimicrobial agents, pulping aids, rinsing aids, polishing agents, personal care compositions, drying agents, antistatic agents, bonding agents, and mixtures thereof.

10. The process of claim 6, wherein the article comprises a material selected from the group consisting of polymers, metals, wood, glass, ceramics, bricks, concretes, cements, natural or synthetic stones, tiles, paper, leather, and textile materials.

11. The process of claim 10, wherein the article is in the form of a fiber, a film, a sheet, a formed or molded part, a laminate, an extruded profile, a coated part, a foamed part, a bead, a particle, or a powder and the material is a polymer.

* * * * *